US008166460B2

(12) United States Patent
Jindal et al.

(10) Patent No.: US 8,166,460 B2
(45) Date of Patent: Apr. 24, 2012

(54) SYSTEM AND METHOD FOR ANALYZING HTTP SESSIONS

(75) Inventors: Rahul Jindal, Longwood, FL (US);
Rohit Aggarwal, Sanford, FL (US);
Mike Sauer, North Bend, OH (US)

(73) Assignee: Convergys CMG Utah, Inc., Salt Lake City, UT (US)

( * ) Notice: Subject to any disclaimer, the term of this patent is extended or adjusted under 35 U.S.C. 154(b) by 1247 days.

(21) Appl. No.: 11/860,113

(22) Filed: Sep. 24, 2007

(65) Prior Publication Data

US 2008/0098119 A1    Apr. 24, 2008

Related U.S. Application Data

(60) Provisional application No. 60/828,863, filed on Oct. 10, 2006.

(51) Int. Cl.
*G06F 9/44* (2006.01)
*G06F 15/16* (2006.01)
(52) U.S. Cl. ........................................ 717/126; 709/236
(58) Field of Classification Search .................. 717/126; 709/236
See application file for complete search history.

(56) References Cited

U.S. PATENT DOCUMENTS

| 6,591,272 | B1 * | 7/2003 | Williams ............................. 1/1 |
| 7,185,286 | B2 * | 2/2007 | Zondervan et al. ........... 715/762 |
| 7,207,002 | B2 * | 4/2007 | Mireku .......................... 715/234 |
| 7,668,904 | B2 * | 2/2010 | Newport et al. ............... 709/203 |
| 7,676,492 | B2 * | 3/2010 | Bodily et al. .......... 707/999.103 |
| 7,702,947 | B2 * | 4/2010 | Peddada ........................ 714/4.1 |
| 7,984,113 | B2 * | 7/2011 | Steinwagner ................. 709/219 |
| 2005/0108627 | A1 * | 5/2005 | Mireku .......................... 715/513 |

OTHER PUBLICATIONS

Le Goff et al., "Object Serialization and Deserialization Using XML," CERN, 2001, 14pg.*

* cited by examiner

*Primary Examiner* — Li Zhen
*Assistant Examiner* — Ryan Coyer
(74) *Attorney, Agent, or Firm* — Frost Brown Todd LLC; William S. Morriss

(57) ABSTRACT

Software intended to operate in a clustered environment can be tested for appropriate failover behavior through the use of an automated tool which allows failover to be simulated without requiring that the application be deployed in a cluster environment and observing the effects of actual failover. Such an automated tool can measure the characteristics of one or more session objects created by the application and provide appropriate messages for a developer when those characteristics indicate improper coding for failover.

8 Claims, 1 Drawing Sheet

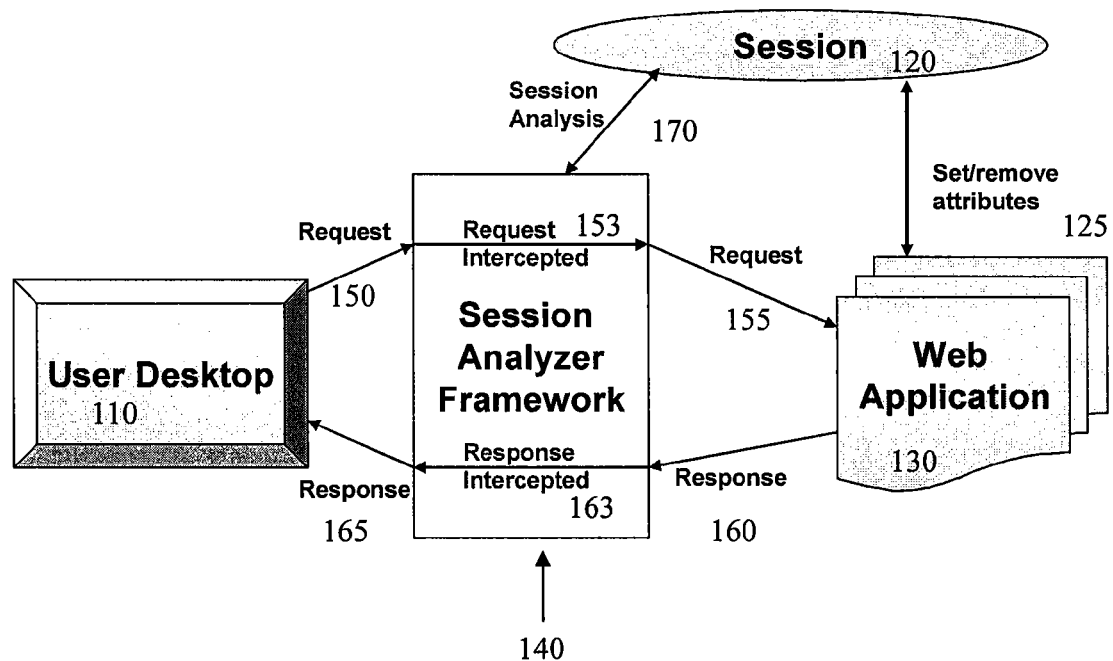

SYSTEM AND METHOD FOR ANALYZING HTTP SESSIONS

CROSS REFERENCE TO RELATED APPLICATIONS

This application claims the benefit of U.S. Provisional Application 60/828,863 entitled "System and Method for Analyzing HTTP Sessions" filed on Oct. 10, 2006, the disclosure of which is hereby incorporated by reference in its entirety.

FIELD

Certain embodiments of this invention can be applied in the field of testing HTTP Sessions for a web application in a clustered environment.

BACKGROUND

In J2EE, an HTTP session stores information about the user and the state of the user interaction. In addition to storing data collected from the user, the session also stores any data that may be cached from the database. Session information may be replicated in a clustered environment to provide high availability in the case of an application server failure. That is, the user session may be replicated in another server that is part of the cluster. As is known to those of ordinary skill in the art, while sessions can be replicated between servers in a clustered environment, replication can also be between a server and a database and another storage device. In such a case, a second server can pull appropriate information from the database or storage device in the case of a failure in the first application server.

In computers, clustering is the use of multiple computers, typically PCs or UNIX workstations, multiple storage devices, and redundant interconnections, to form what appears to users as a single highly available system. Cluster computing can be used for load balancing as well as for high availability. Advocates of clustering suggest that the approach can help an enterprise achieve 99.999 availability in some cases. One of the main ideas of cluster computing is that, to the outside world, the cluster appears to be a single system.

A common use of cluster computing is to load balance traffic on high-traffic Web sites. A Web page request is sent to a "manager" server, which then determines which of several identical or very similar Web servers to forward the request to for handling. Having a Web farm (as such a configuration is sometimes called) allows traffic to be handled more quickly.

Clustering has been available since the 1980s when it was used in DEC's VMS systems. IBM's sysplex is a cluster approach for a mainframe system. Microsoft, Sun Microsystems, and other leading hardware and software companies offer clustering packages that are said to offer scalability as well as availability. As traffic or availability assurance increases, all or some parts of the cluster can be increased in size or number. (See, HTTP://searchdatacenter.techtarget.com/sDefinition/0,,sid80_gci762034,00.html).

In clustering, the session state in one server is copied to one of the other servers in the cluster, or to a database or other storage device (depending upon the cluster configuration). The session data is copied whenever the session is modified. This is a replicated session. (See, HTTP://www.onjava.com/pub/a/onjava/2004/11/24/replication1.html)

However, if the application does not program the session objects correctly, the replication of the session to the backup server will not be proper and the application will not be able to failover gracefully (and with as little impact as possible on the user utilizing the application). To test an application for these errors, one must bring the web server down upon each page request as if a failover had occurred to check if the session information was correctly duplicated in the cluster as intended. Most applications have many screens so this is a very time-consuming process and, indeed, it sometimes becomes infeasible to manually test an application for proper functioning in the case of a failover.

In order to meet the challenges posed by the above changes it is necessary to create a system/method which has the ability to gather information to test web applications in a clustered environment.

SUMMARY

As an example of potential implementations of the teachings of this application, it is possible that, in light of the disclosure set forth herein, one of ordinary skill in the art could create a computer readable medium having stored thereon a set of data operable to configure a computer to perform some set of acts. For the purpose of clarity, in the context of this application the phrase "computer readable medium" should be understood to include any object, substance, or combination of objects or substances, capable of storing data or instructions in a form in which they can be retrieved and/or processed by a device. A "computer readable medium" should not be limited to any particular type or organization, and should be understood to include distributed and decentralized systems however they are physically or logically disposed, as well as storage objects of systems which are located in a defined and/or circumscribed physical and/or logical space. Similarly, a "computer" should be understood to mean a device or group of devices which is capable of performing one or more logical and/or physical operations on data to produce a result. "Data" should be understood to refer to information which is represented in a form which is capable of being processed, stored and/or transmitted. Non-limiting examples of data include computer source code, computer object code, word processing files, and information residing on the random access memory of a commercial personal computer system. The term "set" (e.g., a "set" of acts) should be understood to refer to one or more of the things within the scope of the "set" (e.g., one or more acts), as well as to all things within the "set".

In the case where the teachings of this application are used to implement a computer readable medium such as described above, the set of acts which could be performed by a computer configured by data stored on that medium might include receiving a session object, and the session object might itself comprise one or more subobjects. For the sake of clarity, in this context, the term "receive" (and various forms thereof) should be understood to refer to obtaining access to something, whether through the agency of the entity receiving (e.g., by processing data to identify patterns) or through the agency of some other entity (e.g., an external system providing data to the receiving entity). Also, a "session object" should be understood to refer to a data structure which stores data regarding a session between a user and an application. A "subobject" should be understood to refer to a data structure which is contained within a larger data structure. It should be understood that a "subobject" could itself contain additional "subobjects."

In addition to receiving a session object, a set of data stored on a computer readable medium might be operable to configure a computer to perform further acts, such as serializing and deserializing the session object. In cases where the session object comprises one or more subobjects, serializing and deserializing the session object might comprise serializing and deserializing the one or more subobjects. In this context, the term "serialize" (and various forms thereof) should be understood to refer to saving data to a storage medium in binary form. Similarly, the term "deserialize" (and various forms thereof) should be understood to refer to retrieving data from a storage medium where it had been stored in binary form.

In addition to simply serializing or deserializing a session object, it is also possible that a computer might be configured by data stored on a computer readable medium to perform acts such as detecting a serialization error in a subobject from the session object and providing a serialization error message identifying the subobject for which the serialization error was detected. Similarly, the computer might be configured to detect a deserialization error in a subobject from said one or more subobjects and provide a deserialization error message identifying the subobject for which the deserialization error was detected. These acts could even be performed if the session object comprised a plurality of subobjects. Further, the set of data could be operable to configure the computer to perform the acts of serializing and deserializing the session object in response to a page request. For the sake of clarity, the term "page" should be understood to refer to an identifiable set of data provided as a unit. For example, a file notated with hypertext markup language and identified on a network by a uniform resource locator could be referred to as a "page." Also, the term "response" should be understood to refer to a result (e.g., an action) triggered at least in part by a specific condition. Thus, when something (e.g., serializing and deserializing) happens in "response" to a "page request," it should be interpreted to mean that something (e.g., serializing and deserializing) would be triggered at least in part by the page request.

Also, in some scenarios where a set of data stored on a computer readable medium is operable to configure a computer to perform a set of acts comprising serializing and deserializing a session object, those acts might be configured to take place during a session between a user and an application. Such a session might be a simulated session, and might take place during a single connection. For the purpose of clarity, a "simulated session" should be understood to refer to a representation or model of an actual session. Such a simulated session could, for example, be used to test the operation of an application intended to be deployed in a cluster computer system without actually making such a deployment. Further, in some scenarios the set of data stored on the computer readable medium could be operable to configure a computer to perform the acts of serializing and deserializing a session object in conjunction with a development environment, where a "development environment" is understood to refer to a set of processes and programming tools used to create computer software. In some case, the set of data stored on the computer readable medium might also include code for the development environment, with the term "code" being understood to refer to either statements written in a particular programming language (source code), or to source code after it has been processed into commands which can be executed by a computer (object code) or both, depending on the context.

As a further demonstration of potential applications for the teachings of this disclosure, in some scenarios where a computer readable medium has a set of data stored thereon operable to receive a session object, that session object might comprise a transient, and a set of acts the set of data is operable to configure a computer to perform might include reading a set of configuration information identifying the transient. Also, in some circumstances, serializing and deserializing a session object might comprise nullifying said transient. For the purposes of this disclosure a "transient" should be understood to refer to a data item which is designed to be recreated as opposed to replicated when a session transitions from one computer in a cluster to another. Further, "configuration information" should be understood to refer to information which is used to set up a computer in a particular manner to accomplish a task or function in a specified manner. Also, the term "nullify" (and various forms thereof) should be understood to refer to the act of invalidating the data "nullified," for example by setting a value to NULL.

As a further example of how the teachings of this disclosure could be implemented in relation to transients, in some instances where a computer readable medium comprises a set of data operable to configure a computer to serialize and deserialize a session object that comprises a transient, the set of data might also be operable to configure a computer to provide an indication to a user if the transient value is not restored after the serialization and deserialization of the session object. For the sake of clarity, providing an "indication" to a user should be understood to refer to providing some sign of the thing being "indicated."

Of course, it should be understood that the teachings of this disclosure are not limited to being implemented as described above. For example, it is also possible that the teachings of this disclosure could be implemented as a computer readable medium having stored thereon a set of data operable to configure a computer to perform a set of acts comprising: presenting an interface designed to allow a user to configure a set of tolerances for a session object, provide a tolerance message if a session object has an attribute outside of the tolerances configured by the user, and detecting a change made to the session object during a session and providing a change message unless said change is made via an approved method from a set of approved methods. Also, in some circumstances, the set of approved methods might be configurable by the user.

For the sake of clarity, certain words used in the above description should be understood as having particular meanings. For example, an "interface" should be understood to refer to a set of tools, processes, and specifications which are used to communicate information between entities. Further, a "tolerance" should be understood to refer to permissible values which can be taken by a parameter, e.g., a numeric range could be a tolerance for a size parameter. Additionally, an "attribute" should be understood to refer to a property or characteristic of a thing. For example, in the context of an object, a data member of that object would be an "attribute" of the object. Similarly, the term "message" should be understood to refer to a communication which contains some information to be provided to a recipient. Further, the term "detect" (and various forms thereof) should be understood to refer to discovering, ascertaining, or being informed of the thing being "detected." Also, a "method" should be understood to refer to a set of computer executable instructions which, when executed, allows a user to perform a particular interaction. In that vein, an "approved" method should be understood to refer to a method whose use is authorized for a particular purpose.

As a further refinement on the above, it is also possible that, in a case where a session object comprises a plurality of subobjects, and a set of data stored on a computer readable medium is operable to configure a computer to provide a tolerance message in cases where an attribute of a session object is outside a tolerance, the tolerance message might include an indication of a contribution of each subobject from said set of subobjects to said attribute outside the tolerance. As an example of such an indication, if a session object was given a size tolerance of 4 kilobytes, and the size of the session object was detected to have a size of five kilobytes, the tolerance message might provide a list of all subobjects of the session objects and the size of those subobjects.

The terms engine/application/program/system, as used herein, may refer to any embodiment of computer-executable instructions on a computer readable medium, including but not limited to software, hardware, firmware, modules, programs, routines, etc. The programs described herein are presented according to principles of object-oriented design; however, other programming methodologies may be used as well. The terms and concepts inherent to this model will be easily understood by those of skill in the art.

In some embodiments there might be one or more software routines, defined as computer executable instructions, which might allow for the detection of events and the analysis of those events. It should be understood that software routines are intended to include any computer executable instructions, regardless of how embodied, including in software, hardware, firmware, encoded data, source code, machine language, object code, or any other method for expressing or storing such instructions either presently known or subsequently developed.

Events are interactions between a user, a website and a website server. For instance, a customer logging into a self-care web site may comprise an event. When being processed by software routines, events might be represented by data objects which include one or more fields.

In telecommunication, a session is a series of interactions between two computerized communication end points that occur during the span of a single connection. Typically, one end point requests a connection with another specified end point and if that end point agrees to the connection, the end points take turns exchanging commands and data ("talking to each other"). The session begins when the connection is established at both ends and terminates when the connection is ended. In the standard industry communications reference model, Open Systems Interconnection (OSI), the Session layer (sometimes called the "port layer") manages the setting up and taking down of the association between two communicating end points that is called a connection. A connection is maintained while the two end points are communicating back and forth in a conversation or session of some duration.

Listeners are pieces of coding (computer-executable instructions) (also called listener objects) that may be defined to be invoked when certain events occur. In J2EE, for instance, a listener object is created by defining a listener class as an implementation of a listener interface. For instance, a listener object may be defined to listen for creation of the session, changes in attributes, requests, and more to monitor events. When a listener method is invoked, it is passed an event that contains information appropriate to the event. (See, HTTP://java.sun.com/j2ee/1.4/docs/tutorial/doc/Servlets4.html).

A filter is a Java class that is invoked in response to a request for a resource in a Web Application. Resources include Java Servlets, JavaServer pages (JSP), and static resources such as HTML pages or images. A filter intercepts the request and can examine and modify the response and request objects or execute other tasks. Filters are an advanced J2EE feature primarily intended for situations where the developer cannot change the coding of an existing resource and needs to modify the behavior of that resource. (See, HTTP://e-docs.bea.com/wls/docs61/webapp/filters.html.)

In an embodiment, there is provided a method and associated system for testing HTTP sessions for a web application in a clustered environment wherein the parameters may be hardcoded. In another embodiment, a configuration interface (e.g., a GUI and/or via command-line), to the Session Analyzer engine, may be provided to allow a tester to define parameters (e.g., size of session objects, interfaces used to access session objects). Next, a web application may be deployed in a non-clustered server environment. Upon invocation, the Session Analyzer engine utilizes listeners and filters to obtain session data associated with request and response cycles between an end-user and the web application. Finally, the Session Analyzer engine determines if the collected session data is within tolerances defined by the tester and, if not, generates appropriate errors.

In an embodiment, there is provided a system for testing replicated sessions for a web application in a clustered environment comprising an interface, a session analyzer, a web application wherein said interface provides means to allow a tester to define a set of parameters to test a particular web session wherein said parameters include a size for a set of session objects and a set of interfaces used to access said set of session objects; said set of parameters are used to configure said session analyzer; said web application is deployed in a non-clustered server environment and said tester activates said session analyzer; said session analyzer utilizes a set of listeners and filters to obtain session data associated with requests and response cycles between an end-user and the web application; said session analyzer determines if the collected session data is within tolerances defined by the tester and, if not, generates appropriate errors.

BRIEF DESCRIPTION OF THE DRAWINGS

FIG. 1 depicts an embodiment of the system and method described herein.

DETAILED DESCRIPTION

All embodiments described herein are intended to be illustrative and, therefore, non-limiting. Various embodiments (including systems and methods) for creating a framework according to the principles described herein are disclosed. These embodiments may employ one or more of the following features disclosed herein either singly or in combination. These embodiments may facilitate the emerging technologies discussed in the background above, as well as technologies yet to come.

Referring to FIG. 1, in an embodiment, a system [140] may be set up to intercept the HTTP session [120] at predefined stages [153, 163] of the request [150/155]/response [160/165] processing to analyze [140] the session data for an interaction between a user [110] and a web application [130]. The system [140] may make use of features such as listeners and filters (for instance, as provided in J2EE), to intercept the session [120] and check for the criteria that it should meet as attributes are created/set/removed by the web application [130] during the course of the session [120]. At 170, a copy of the session is passed on to the framework for analysis.

The principles of this invention may also be applied to other environments (now known or developed in the future) utilizing sessions that are being replicated in a clustered environment.

In an embodiment, the application [130] to be tested may be deployed in a single server instance instead of a clustered environment. The system [140] may be activated via either providing a command line argument or by setting a variable in a registry. The programming instructions may be configured to simulate cluster failover.

In an embodiment, the system [140] may be configured to verify that required objects in the session [120] are serializable, monitor the size of session objects, check whether application developers are using appropriate platform interfaces to access the HTTP session object, serialize and deserialize the session, provide details for reported errors to enable developers to pinpoint the problem and fix it (for example, the system [140] may iteratively list the size of sub-objects (including sub-sub objects, and so on) within objects so that developers can find the object that is oversized, provide details on objects that are non-serializable, report the page where the local session information was changed without using the setAttribute function call, etc.).

In an embodiment, there is provided a SessionListener and a ServletFilter. The SessionListener is triggered each time a session is created/destroyed or when a change is made to a session. The ServletFilter is triggered upon each page request.

In an embodiment, for every session change (set/remove attribute) [125], the system [140] may:
i. serialize session data (includes data required to identify the user across multiple web pages or Web sites such as information about the user and data entered by the user that is cached for future use by the web application) and store this data in a flat file, database, remote storage or any other type of computer memory (e.g., a SessionMap variable);
ii. check if session change was accomplished through approved interfaces (e.g., setAttribute of ManagedSession object) and, if not, generate a warning;
iii. check if session size is bigger than a predefined limit and, if so, generate a warning message.

In an embodiment, for every request, the system [140] may
i. Serialize session data and put it in a sessionmap variable (during serialization the non-serializable and transient objects may be set to null, thereby losing any data stored in the objects);
ii. Process the request;
iii. After processing is complete,
Deserialize sessionmap data;
Check if the session size is bigger than a specified limit (e.g., 4K) and, if so, then generate a warning;
Reset the session with deserialized sessionmap data to simulate a server failover.

In an embodiment, for every response, the system [140] may
i. Reset the internal sessionmap data;
ii. Check if session size is bigger than a specified limit and, if so, generate a warning message.

In an embodiment, the testing infrastructure may be configured to check for the following cases upon the trigger of the ServletFilter and SessionListener:
Case 1: Check if objects in the session are serializable
Case 2: Check if the local session was changed but setAttribute was not called
Case 3: Check if size of the serialized session exceeds 4 Kb
Case 4: Check if the ManagedSession object is being used and not the HttpSession object directly
Case 5: Test for proper handling of transient data by setting them to NULL as these are not replicated These ServletFilter and SessionListener classes may be part of the pf-web jar which should be included in the Java Archive Files Oar files) of components that want to use Platform's web infrastructure. In a preferred embodiment, a deployment will include the latest updates to the PF code (currently, PF2.2.1 but future versions should be considered included within the scope of this invention) including the latest pf-web.jar.

In an embodiment, the system [140] may be configured and provided as a plug-in to a development environment. In this manner, the application [130] to be tested does not need to be built around the tool but the tool may be injected into the application during testing.

By default the classes and the configuration will NOT be active. To activate the Cluster testing, you can use the following mechanism:
1. Pass-DClusterTestEnable="yes" to the server startup as java option If the testing is ON, there will be a log message "CLUSTER LOGGING ENABLED" which will indicate that the framework code is ON. Otherwise there will be a log message "CLUSTER LOGGING DISABLED". All errors will be reported in the weblogic server log.

A web application developer may add the cluster testing framework as part of their web.xml. The application developer may test for cluster errors during unit test and other test cycles. Once this is set up, the developer may including the following VM parameter when weblogic is started-DClusterTestEnable="yes" or in the registry context "/Infinys/PF/ClusterTester" set "enable" to "yes". This will start producing log messages in server.log file(s) in the weblogic server domain directory. The developer may grep for "CLUSTERLOGGER" in the log files to get the logs produced by the Cluster Failover Testing Infrastructure. The log statements will have enough information for the developer to detect the problem and correct the code. If any variable or object is marked as transient (i.e. transient="true" in model-config.xml) then everything that might be affected code should be tested (i.e. all actions/helpers uses this variable) and check log generated by this cluster failover tool.

As an example of how certain principles described herein could be applied, consider the design of a banking application for deployment in a clustered environment. In use, the banking application might have a log on screen which captures a user's user ID. With the user ID having been provided, the application might retrieve the user's name from a server. Once the user has logged in, the application might provide the functionality of allowing the user to transfer funds from one account to another. As a demonstration both of the benefits of clustering, and of the possible obstacles to successfully implementing an application in a clustering environment, assume that a user does try to transfer money from one account to another, and, further assume that, after the user indicates that he or she wants to transfer money, the primary server on which the application is running fails. In a clustered environment, this failure can be responded to by switching the session between the user and the banking application over to another server in the cluster. This can be done by the second server deserializing a session object which had been created by the first server while interacting with the user. Ideally, this would allow the session to transparently continue on the new server with no interruption for the user. However, if the necessary data had not been stored in the session object, or if some of the data was stored in the session object improperly, or if the second server was not programmed to properly deserialize the session object or continue after failover, or if some other problem occurs, the session will not failover properly. As set forth previously, the teachings of this disclosure can be used in testing applications to minimize the likelihood of improper failover. A concrete example of how certain of those teachings might be implemented is set forth below.

One check which can be performed to test if a session will failover properly is to serialize and deserialize the session object. Using this check will ensure that the session object and each of the subobjects which make up the session object is written to be serializable. If a session object (or one of the subobjects) is not written in this manner, then an error message could be displayed to the developer. For example, in a case where the session object and subobjects are serialized and deserialized in a recursive or iterative manner, the tool could provide an error message which identifies the particular subobject which is not serializable, so that the developer can focus on and modify that subobject as necessary. Also, in the process of serializing and deserializing a session object, any data which is not stored in that session object (e.g., transient data, nonserializable data) could be set to NULL in the deserialized session. A tool could check to ensure that the application is coded properly for failover by determining if the application is able to properly recreate the values for this data. For example, in a banking application such as described above, the session object might include the user's user ID, but not include the user name. If, after deserialization, the application continues the session without properly obtaining the user's user name, for example, it might provide a message such as "Welcome NULL" on a screen, or try to do something to an account registered to NULL, the developer could be informed that the application was not failing over correctly. It should be noted, of course, that providing a messages such as "Welcome NULL" is not the sole technique contemplated by the inventors for informing a developer that an application is not correctly coded to recreate transients. For example, an application could cause an error or throw an exception the case where the application tries to manipulate a null data variable, expecting it to have non-null data.

Of course, the description of serialization and deserialization set forth above is not intended to imply that checking for proper failover requires serialization or deserialization, or that serialization and deserialization will necessarily be included in such testing. For example, it is also possible that a testing tool could monitor various parameters of a session object during a session to ensure that various tolerances for that object were not exceeded. Such monitoring could be included in a testing tool in addition to, or as an alternative to the serialization and deserialization functionality described above. Thus, the description above should be understood to be illustrative only, and not limiting.

The foregoing is considered as illustrative only of the principles of the invention. Embodiments may be developed comprising systems, methods, computer-executable instructions deployed on a computer readable medium, and interfaces utilizing the principles set forth above. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A non-transitory computer readable medium having a set of data stored thereon, said set of data operable to configure a computer to perform a set of acts comprising:

serializing one or more session objects, and deserializing the one or more session objects, during a single session between a user and an application, wherein the session comprises a plurality of page requests and wherein said set of data is operable to configure the computer to perform the acts of serializing the session objects and deserializing the session objects in response to each page request from said plurality of page requests;

receiving a first session object, wherein said first session object comprises one or more subobjects;

serializing said first session object, wherein serializing said first session object comprises serializing said one or more subobjects;

detecting a serialization error in a subobject from said one or more subobjects;

providing a serialization error message identifying the subobject for which the serialization error was detected;

deserializing said first session object, wherein deserializing said first session object comprising deserializing said one or more subobjects;

detecting a deserialization error in a subobject from said one or more subobjects;

providing a deserialization error message identifying the subobject for which the deserialization error was detected; and reading a set of configuration information identifying a transient in the first session object and testing portions of the application which use the transient and providing an indication if a value for the transient changes as a result of a serialization and deserialization of the first session object.

2. The non-transitory computer readable medium of claim 1 wherein said session object comprises a plurality of subobjects.

3. The non-transitory computer readable medium of claim 1 wherein said set of data is operable to configure the computer to perform the acts of serializing the first session object and deserializing the first session object in response to a first page request.

4. The non-transitory computer readable medium of claim 1 wherein said session is a simulated session.

5. The non-transitory computer readable medium of claim 1 wherein said set of data is operable to cause a computer to perform the acts of serializing and deserializing said one or more session objects in conjunction with a development environment.

6. The non-transitory computer readable medium of claim 5 wherein said set of data further comprises code for said development environment.

7. The non-transitory computer readable medium of claim 1 wherein serializing and deserializing said first session object comprises nullifying said transient.

8. The non-transitory computer readable medium of claim 7 wherein, prior to the acts of serializing and deserializing the session objects, said transient has a first value and wherein said set of data is operable to configure the computer to perform comprises providing an indication to a user if said first value is not restored to said transient after said acts of serializing and deserializing said first session object.

* * * * *